United States Patent
Saito et al.

(10) Patent No.: US 11,053,407 B2
(45) Date of Patent: *Jul. 6, 2021

(54) FLUORINATED COATING MATERIAL, METHOD FOR PRODUCING FLUORINATED COATING MATERIAL, COATED ARTICLE AND ITS PRODUCTION METHOD

(71) Applicant: AGC Inc., Chiyoda-ku (JP)

(72) Inventors: Shun Saito, Chiyoda-ku (JP); Takashi Morizumi, Chiyoda-ku (JP)

(73) Assignee: AGC INC., Tokyo (JP)

(*) Notice: Subject to any disclaimer, the term of this patent is extended or adjusted under 35 U.S.C. 154(b) by 14 days.

This patent is subject to a terminal disclaimer.

(21) Appl. No.: 16/598,502

(22) Filed: Oct. 10, 2019

(65) Prior Publication Data
US 2020/0040211 A1    Feb. 6, 2020

Related U.S. Application Data

(63) Continuation of application No. PCT/JP2018/015908, filed on Apr. 17, 2018.

(30) Foreign Application Priority Data

Apr. 18, 2017 (JP) .............................. JP2017-082011
Apr. 18, 2017 (JP) .............................. JP2017-082117

(51) Int. Cl.
| | | |
|---|---|---|
| *C09D 127/18* | (2006.01) | |
| *C09D 7/20* | (2018.01) | |
| *B05D 3/10* | (2006.01) | |
| *C08F 214/18* | (2006.01) | |
| *C08F 214/26* | (2006.01) | |
| *C09D 5/03* | (2006.01) | |
| *C09D 127/12* | (2006.01) | |

(52) U.S. Cl.
CPC ............ *C09D 127/18* (2013.01); *B05D 3/108* (2013.01); *C08F 214/182* (2013.01); *C08F 214/267* (2013.01); *C09D 5/03* (2013.01); *C09D 7/20* (2018.01); *C09D 127/12* (2013.01); *C08F 2800/10* (2013.01)

(58) Field of Classification Search
CPC combination set(s) only.
See application file for complete search history.

(56) References Cited

U.S. PATENT DOCUMENTS

2015/0112015 A1* 4/2015 Jiang .................. C08F 214/188
524/546

FOREIGN PATENT DOCUMENTS

| JP | 2016-539214 A | 12/2016 | |
|---|---|---|---|
| WO | WO 2013/052790 A2 | 4/2013 | |
| WO | WO 2013/058333 A1 | 4/2013 | |
| WO | WO 2015/060970 A1 | 4/2015 | |
| WO | WO 2015/137286 A1 | 9/2015 | |
| WO | WO-2015137286 A1 * | 9/2015 | ........... C09D 127/12 |
| WO | WO 2016/040525 A1 | 3/2016 | |

OTHER PUBLICATIONS

WO2015137286 English Machine Translation prepared Sep. 8, 2020. (Year: 2020).*
International Search Report dated Jun. 12, 2018 in PCT/JP2018/015908, filed on Apr. 17, 2018.

* cited by examiner

*Primary Examiner* — Christopher M Rodd
(74) *Attorney, Agent, or Firm* — Foley & Lardner LLP

(57) ABSTRACT

To provide a fluorinated coating material capable of forming a coating film excellent in water repellency and substrate adhesion. Further, to provide a method for producing the coating material, a coated article and its production method. A fluorinated coating material comprising a fluorinated polymer having the following units F, the following units 1 and the following units 2: units F: at least one type of units selected from the group consisting of units based on $CF_3$—$CH=CHF$ and units based on $CF_3$—$CF=CH_2$; units 1: at least one type of units selected from the group consisting of units having a carboxy group, units based on allyl alcohol and units based on a hydroxyalkyl allyl ether; units 2: at least one type of units selected from the group consisting of units based on a vinyl ether, units based on a vinyl ester, units based on an allyl ether (excluding a hydroxyalkyl allyl ether), units based on an allyl ester and units based on a (meth)acrylic acid ester.

15 Claims, No Drawings

FLUORINATED COATING MATERIAL, METHOD FOR PRODUCING FLUORINATED COATING MATERIAL, COATED ARTICLE AND ITS PRODUCTION METHOD

This application is a continuation of PCT Application No. PCT/JP2018/015908, filed on Apr. 17, 2018, which is based upon and claims the benefit of priority from Japanese Patent Application No. 2017-082117 filed on Apr. 18, 2017 and Japanese Patent Application No. 2017-082011 filed on Apr. 18, 2017. The contents of those applications are incorporated herein by reference in their entireties.

TECHNICAL FIELD

The present invention relates to a fluorinated coating material, a method for producing a fluorinated coating material, a coated article and its production method.

BACKGROUND ART

As a coating material capable of forming a coating film excellent in weather resistance, a coating material containing a fluorinated polymer has been known. Patent Document 1 discloses a coating material comprising a fluorinated polymer consisting solely of units based on $CF_3$—$CF$=$CH_2$, units based on a monomer selected from the group consisting of a vinyl ester and a vinyl ether, and units based on a vinyl ether having a hydroxy group, and an organic solvent.

PRIOR ART DOCUMENTS

Patent Documents

Patent Document 1: JP-A-2016-539214

DISCLOSURE OF INVENTION

Technical Problem

The present inventors have studied a coating film formed by using the fluorinated polymer disclosed in Patent Document 1 and as a result, found that it is not sufficient in the adhesion to a substrate (substrate adhesion) and weather resistance.

Under these circumstances, it is an object of the present invention to provide a fluorinated coating material capable of forming a coating film excellent in physical properties such as water repellency, substrate adhesion and weather resistance. Further, another object of the present invention is to provide a method for producing a fluorinated coating material, a coated article and its production method.

Solution to Problem

The present inventors have conducted extensive studies to achieve the above objects and as a result, found that the objects can be achieved by the following constitution.

[1] A fluorinated coating material comprising a fluorinated polymer having the following units F, the following units 1 and the following units 2:
  units F: at least one type of units selected from the group consisting of units based on $CF_3$—$CH$=$CHF$ and units based on $CF_3$—$CF$=$CH_2$;
  units 1: at least one type of units selected from the group consisting of units having a carboxy group, units based on allyl alcohol and units based on a hydroxyalkyl allyl ether;
  units 2: at least one type of units selected from the group consisting of units based on a vinyl ether, units based on a vinyl ester, units based on an allyl ether (excluding a hydroxyalkyl allyl ether), units based on an allyl ester and units based on a (meth)acrylic acid ester.

[2] The fluorinated coating material according to [1], wherein the units F consist of units based on $CF_3$—$CH$=$CHF$ and units based on $CF_3$—$CF$=$CH_2$.

[3] The fluorinated coating material according to [1] or [2], wherein the content of the units F is from 20 to 80 mol % to all units in the fluorinated polymer.

[4] The fluorinated coating material according to any one of [1] to [3], wherein the units having a carboxy group are units based on a monomer represented by the formula $CHR^{11}$=$CHR^{12}$-$Q^1$-COOH:
  wherein $R^{11}$ and $R^{12}$ are each independently a hydrogen atom or a $C_{1-3}$ alkyl group, and $Q^1$ is a single bond, a $C_{1-12}$ alkylene group or a $C_{4-12}$ alkylene group having —$C$(=$O$)$O$—.

[5] The fluorinated coating material according to any one of [1] to [3], wherein the units having a carboxy group are units having a carboxy group formed by reacting a polycarboxylic acid anhydride with hydroxy groups of a fluorinated polymer having units having a hydroxy group.

[6] The fluorinated coating material according to any one of [1] to [5], wherein at least a part of the units 2 are at least one type of units selected from the group consisting of units based on a vinyl ether and units based on a vinyl ester, and the total content of the units based on a vinyl ether and the units based on a vinyl ester is from 10 to 50 mol % to all units in the fluorinated polymer.

[7] The fluorinated coating material according to any one of [1] to [6], which further contains a curing agent, wherein the curing agent is a compound having in one molecule at least two epoxy groups, carbodiimide groups, oxazoline groups or β-hydroxyalkylamide groups.

[8] The fluorinated coating material according to any one of [1] to [7], which further contains an organic solvent, the fluorinated polymer being dissolved in the organic solvent, and which is used as a solvent-based coating material.

[9] The fluorinated coating material according to any one of [1] to [7], wherein the fluorinated polymer is powdery, and which is used as a powder coating material.

[10] The fluorinated coating material according to [9], wherein the units 2 have a $C_{4-8}$ alkyl group represented by the formula —$C(Z^{21})_3$ (wherein three $Z^{21}$'s are each independently a $C_{1-5}$ alkyl group), a $C_{6-10}$ cycloalkyl group, a $C_{6-10}$ cycloalkylalkyl group, a $C_{6-10}$ aryl group or a $C_{7-12}$ aralkyl group.

[11] The fluorinated coating material according to any one of [1] to [7], which further contains water, the fluorinated polymer being dispersed in water, and which is used as an aqueous coating material.

[12] The fluorinated coating material according to [11], wherein at least a part of the units 2 have a group represented by the formula —$Y^2$—$O(M^2O)_{n2}R^2$,
  wherein $Y^2$ is a $C_{2-12}$ bivalent saturated hydrocarbon group, $M^2$ is a $C_{2-4}$ alkylene group, and at least 50% by the number of n2 $M^2$'s are ethylene groups, $R^2$ is a hydrogen atom or an alkyl group having at most 4 carbon atoms, and n2 is an integer of from 8 to 22.

A method for producing the fluorinated coating material as defined in [11], which comprises adding a polycarboxylic acid anhydride to an organic solvent solution of the fluorinated polymer containing no units having a carboxy group and containing units having a hydroxy group, so that they react with each other, to obtain a fluorinated polymer having units having a carboxy group, and replacing the organic solvent with water to disperse the fluorinated polymer in water.

[14] The method for producing a coated article, which comprises applying the fluorinated coating material as defined in any one of [1] to [12] on a substrate to form a coating layer, and curing the coating layer to form a coating film on the substrate.

[15] A coated article comprising a substrate and a coating film formed on the substrate from the fluorinated coating material as defined in any one of [1] to [12].

ADVANTAGEOUS EFFECTS OF INVENTION

According to the present invention, it is possible to provide a fluorinated coating material capable of forming a coating film excellent in physical properties such as water resistance (particularly static water repellency which is an index how water attached to the coating film does not spread, the same applies hereinafter), substrate adhesion and weather resistance. Further, according to the present invention, it is possible to provide a method for producing the fluorinated coating material, a coated article and its production method.

DESCRIPTION OF EMBODIMENTS

Meanings of terms in this specification are as follows.

"(Meth)acrylic" generally means "acrylic" and "methacrylic".

A "unit" generally means an atomic group derived from one molecule of a monomer, directly formed by polymerization of the monomer, and an atomic group obtained by chemical conversion of a part of the atomic group. The content (mol %) of each type of the units to all units in a polymer is obtained by analyzing the polymer by nuclear magnetic resonance spectroscopy, or can be estimated from the amounts of monomers charged.

The "average particle size" of particles is, in a case where the particles are not dispersed in a solvent, a 50% size obtained by calculating a volume average from particle size distribution measured by using a known particle size distribution measuring apparatus ("Helos-Rodos", tradename, manufactured by Sympatec GmbH) based on laser diffraction method as measurement principle, and in a case where the particles are dispersed in a solvent, a D50 value obtained by dynamic light scattering method using ELS-8000 (manufactured by Otsuka Electronics Co., Ltd.). D50 is a volume-based cumulative 50% particle diameter starting from the smaller particle side in particle size distribution of particles measured by dynamic light scattering method.

The "glass transition temperature" is the midpoint glass transition temperature as measured by differential scanning calorimetry (DSC) method. The "glass transition temperature" will sometimes be referred to as "Tg".

The "melt viscosity" means a value of the melt viscosity of a polymer at a predetermined temperature, when heated at a heating rate of 10° C. /min from 130° C. to 200° C. by a rotary rheometer.

The "thixotropy index" means a viscosity ratio ($\eta$5 rpm/$\eta$50 rpm) of the viscosity ($\eta$5 rpm) at a number of revolutions of 5 rpm to the viscosity ($\eta$50 rpm) at a number of revolutions of 50 rpm by a type E viscometer.

The "number average molecular weight" is a value measured by gel permeation chromatography using polystyrene as a standard substance. The "number average molecular weight" will sometimes be referred to as "Mn".

The "hydroxy value" is a value measured in accordance with the method in JIS K 1557-1 (2007).

The "acid value" is a value measured in accordance with the method in JIS K 0070-3 (1992).

The "film thickness" is a value measured by using an eddy current type thickness meter (tradename "EDY-5000", manufactured by SANKO ELECTRONIC LABORATORY CO., LTD.).

The fluorinated coating material of the present invention comprises a fluorinated polymer having the units F, the units 1 and the units 2.

The units F are at least one type of units selected from the group consisting of units based on $CF_3$—CH=CHF and units based on $CF_3$—CF=$CH_2$. Hereinafter $CF_3$—CH=CHF and $CF_3$—CF=$CH_2$ will generally be referred to as "monomer F".

The units 1 are at least one type of units selected from the group consisting of units having a carboxy group, units based on allyl alcohol and units based on a hydroxyalkyl allyl ether. The monomers constituting the units 1 will generally be referred to as "units 1".

The units 2 are at least one type of units selected from the group consisting of units based on a vinyl ether, units based on a vinyl ester, units based on an allyl ether (excluding a hydroxyalkyl allyl ether), units based on an allyl ester and units based on a (meth)acrylic acid ester. Hereinafter the monomers constituting the units 2 will sometimes generally be referred to as "units 2".

The units 1 and the units 2 do not have a fluorine atom. The units 2 may be units having no carboxy group and having a hydroxy group other than units based on allyl alcohol and units based on a hydroxyalkyl allyl ether.

The present inventors have found that with a fluorinated polymer having the units F, the units 1 and the units 2, a coating film excellent in water repellency, substrate adhesion, weather resistance, etc. is likely to be formed. The reason is not necessarily clear, but is estimated as follows.

Since the fluorinated polymer of the present invention contains units based on the monomer F among fluoropropylenes, arrangement of the units 1 and the units 2 tend to be favorable, and alternating copolymerizability of the units 1, the units 2 and the units F tends to be excellent. Accordingly, functional groups of the predetermined structure which the units 1 have are evenly present in the fluorinated polymer, whereby physical properties of the coating film such as water repellency, substrate adhesion and weather resistance will favorably develop.

The present inventors have found that the above effects are achieved similarly regardless of whether the fluorinated coating material of the present invention is a solvent-based coating material, an aqueous coating material or a powder coating material.

Hereinafter, a coating film formed from the fluorinated coating material of the present invention will sometimes be referred to as "the present coating film".

The units F contained in the fluorinated polymer of the present invention may be only one of the units based on $CF_3$—CH=CHF and the units based on $CF_3$—CF=$CH_2$, or may be both. In order that the physical properties of the present coating film will more favorably develop, the units F in the fluorinated polymer consist of both the two types of the units. In a case where the units F in the fluorinated polymer consist of the units based on $CF_3$—CH=CHF and the units based on $CF_3$—CF=$CH_2$, the proportion of the units based on $CF_3$—CH=CHF to the total amount of both the units is preferably from 10 to 90 mol %, particularly preferably from 60 to 85 mol %.

The content of the units F in the fluorinated polymer is preferably from 20 to 80 mol %, more preferably from 30 to 70 mol % to all units in the fluorinated polymer, in order that physical properties of the present coating film such as water resistance or weather resistance will favorably develop.

The units 1 contained in the fluorinated polymer of the present invention are preferably units having a carboxy group (hereinafter sometimes referred to as "units 1C") in that the present coating film is excellent in water resistance and substrate adhesion.

The present inventors have found that a fluorinated polymer having the units F has a small surface free energy due to the —$CF_3$ group which the units F have, and is capable of forming a coating film excellent in water resistance. Whereas, a fluorinated polymer is less likely to wet the substrate, and the substrate adhesion of a coating film formed from the fluorinated polymer should still be improved. Further, the fluorinated polymer is likely to be charged by the —$CF_3$ group which the units F have, and a coating film formed from the fluorinated polymer is likely to be charge with static electricity.

To solve such a problem, the present inventors have found that by incorporating the units 1C into the fluorinated polymer, a coating film excellent in the substrate adhesion while keeping excellent water repellency can be formed. This is considered to be because a hydrophobic moiety (—$CF_3$ group) and a hydrophilic moiety (carboxy group) are arranged in a well-balanced manner on the surface and on the substrate side of the coating film. It was further found that by using the monomer F among fluoropropylenes, by the carboxy group contained in the fluorinated polymer, electrification properties of the fluorinated polymer are suppressed.

The units 1C may be units based on a monomer having a carboxy group (hereinafter sometimes referred to as "monomer 1C") or may be units obtained by converting hydroxy groups of a fluorinated polymer having units based on a hydroxy group to carboxy groups. The latter units are preferably units having a carboxy group, formed by reacting e.g. a polycarboxylic acid anhydride (such as succinic anhydride or phthalic anhydride) with hydroxy groups of the fluorinated polymer having units having a hydroxy group. Some of hydroxy groups in the fluorinated polymer may be converted to carboxy groups, or all hydroxy groups may be converted to carboxy groups.

The units having a hydroxy group in the fluorinated polymer may be units 1 having a hydroxy group or may be units 2 having a hydroxy group.

A monomer having a hydroxy group constituting the units having a hydroxy group may be a vinyl ether, a vinyl ester, an allyl ether, an allyl ester or a (meth)acrylic acid ester, having a hydroxy group. Such a monomer may, for example, be specifically allyl alcohol, cyclohexanedimethanol monovinyl ether, 2-hydroxyethyl vinyl ether, 4-hydroxybutyl vinyl ether, diethylene glycol monovinyl ether, hydroxyalkyl allyl ether (such as 2-hydroxyethyl allyl ether), hydroxyethyl carboxylic acid vinyl ester or hydroxyethyl (meth) acrylate.

The polycarboxylic acid anhydride is preferably an aliphatic dicarboxylic acid anhydride such as succinic anhydride, glutaric anhydride or adipic anhydride.

The monomer 1C may be an unsaturated carboxylic acid or (meth)acrylic acid, and from the viewpoint of more excellent flexibility of the present coating film, preferably a monomer represented by the formula $CHR^{11}$=$CHR^{12}$-$Q^1$-COOH;

wherein $R^{11}$ and $R^{12}$ are each independently a hydrogen atom or a $C_{1-3}$ alkyl group, $Q^1$ is a single bond, a $C_{1-12}$ alkylene group or a $C_{4-12}$ alkylene group having —C(=O)O—, and with a view to improving flexibility of the present coating film, preferably a $C_{6-10}$ alkylene group or a $C_{6-10}$ alkylene group having —C(=O)O—.

The monomer 1C may, for example, be specifically $CH_2$=CHCOOH, $CH(CH_3)$=CHCOOH, $CH_2$=C($CH_3$)COOH or a compound represented by the formula $CH_2$=CH($CH_2)_{n1}$COOH (wherein n1 is an integer of from 1 to 10), and the monomer 1C is preferably $CH(CH_3)$=CHCOOH or $CH_2$=CH($CH_2)_8$COOH.

In a case where the fluorinated polymer has the units 1C, the content of the units 1C in the fluorinated polymer is preferably from 1 to 25 mol %, particularly preferably from 5 to 15 mol %, to all units in the fluorinated polymer, from the viewpoint of water repellency of the present coating film.

In a case where the fluorinated polymer contains the units 1C, from the viewpoint of the substrate adhesion of the present coating film, the acid value is preferably from 1 to 150 mgKOH/g, more preferably from 1 to 100 mgKOH/g, particularly preferably from 1 to 80 mgKOH/g.

The units 1 contained in the fluorinated polymer in the present invention are preferably units (hereinafter sometimes referred to as "units 1A") based on at least one member selected from the group consisting of allyl alcohol and a hydroxyalkyl allyl ether (hereinafter sometimes referred to as "monomer 1A") from the viewpoint of excellent weather resistance of the present coating film.

The present inventors have found that the monomer F, the monomer 1A and the monomer 2 are excellent in copolymerizability, and the units 1A can be introduced efficiently and randomly in the fluorinated polymer. Excellent weather resistance of the resulting coating film is considered to be because the units F, the units 1A and the units 2 are randomly arranged, the —$CF_3$ group which the units F have protects the main chain of the fluorinated polymer, and hydrophilicity of the hydroxy group in the units A and hydrophobicity of the —$CF_3$ group in the units F are well-balanced. The present inventors have found that the above effects develop when the monomer F is used among fluoropropylenes. Presence of the units 1A randomly in the fluorinated polymer means that the units 1A are present as uniformly dispersed, not unevenly in the fluorinated polymer.

As the monomer 1A, only one of allyl alcohol and the hydroxyalkyl allyl ether may be used, or both allyl alcohol and hydroxyalkyl allyl ether may be used. Further, the hydroxyalkyl allyl ether may be used in combination of two or more. The number of carbon atoms in the hydroxyalkyl moiety in the hydroxyalkyl allyl ether is preferably from 2 to 6.

The hydroxyalkyl allyl ether may, for example, be specifically 2-hydroxyethyl allyl ether, 1-allyloxy-2-propanol, 4-allyloxy-1-butanol or 1-allyloxy-2-pentanol.

In a case where the fluorinated polymer has the units 1A, the content of the units 1A in the fluorinated polymer is, from the viewpoint of water repellency of the present coating film, preferably from 1 to 25 mol %, more preferably from 5 to 15 mol % to all units in the fluorinated polymer.

In a case where the fluorinated polymer has the units 1A, from the viewpoint of the substrate adhesion of the present coating film, the hydroxy value is preferably from 1 to 150 mgKOH/g, more preferably from 1 to 100 mgKOH/g, particularly preferably from 1 to 80 mgKOH/g.

The content of the units 1 in the fluorinated polymer is, with a view to improving the physical properties of the present coating film, preferably from 1 to 25 mol %, more preferably from 5 to 15 mol % to all units in the fluorinated polymer.

The monomer 2 is preferably a monomer represented by the formula $X^2$-$Z^2$ (hereinafter sometimes referred to as "monomer 2D") having no carboxy group, other than allyl alcohol and the hydroxyalkyl allyl ether.

$X^2$ is, from the viewpoint of alternating polymerizability with the monomer F and the weather resistance of the present coating film, $CH_2$=CHC(O)O—, $CH_2$=C($CH_3$)C(O)O—, $CH_2$=CHOC(O)—, $CH_2$=CHCH$_2$OC(O)—, $CH_2$=CHO— or $CH_2$=CHCH$_2$O—, preferably $CH_2$=CHOC(O)— or $CH_2$=CHO—.

$Z^2$ is a $C_{1-48}$ monovalent organic group.

Particularly, the fluorinated polymer preferably contains from 10 to 50 mol %, more preferably from 15 to 40 mol % of units based on the monomer 2D wherein $X^2$ is $CH_2$=CHOC(O)— or $CH_2$=CHO—, to all units in the fluorinated polymer, from the viewpoint of the reactivity of the monomer F and the monomer 2D.

In a case where the fluorinated coating material of the present invention contains an organic solvent, the fluorinated polymer is dissolved in the organic solvent, and the fluorinated coating material is a coating material used as a solvent-based coating material, at least a part of the units 2D are preferably units based on a monomer wherein $Z^2$ is a $C_{1-24}$ monovalent hydrocarbon group (hereinafter sometimes referred to as "monomer 2D-S").

The monovalent hydrocarbon group may be linear or branched. Further, the monovalent hydrocarbon group may be a cyclic structure or may have a cyclic structure. Further, the monovalent hydrocarbon group may be a monovalent saturated hydrocarbon group or may be a monovalent unsaturated hydrocarbon group.

The monovalent hydrocarbon group is preferably an alkyl group, a cycloalkyl group, an aryl group or an aralkyl group, more preferably a $C_{2-12}$ alkyl group, a $C_{6-10}$ cycloalkyl group, a $C_{6-10}$ aryl group or a $C_{7-12}$ aralkyl group.

The alkyl group may, for example, be specifically a methyl group, an ethyl group, a tert-butyl group, a hexyl group, a nonyl group, a decyl group or a dodecyl group.

The cycloalkyl group may, for example, be specifically a cyclohexyl group.

The aralkyl group may, for example, be specifically a benzyl group.

The aryl group may, for example, be specifically a phenyl group or a naphthyl group.

The monomer 2D-S may, for example, be specifically ethyl vinyl ether, vinyl acetate, vinyl propionate, nonyl vinyl ether, 2-ethylhexyl vinyl ether, hexyl vinyl ether, n-butyl vinyl ether or vinyl neodecanoate (manufactured by HEXION, tradename: "VeoVa 10", etc.).

The monomer 2D-S may be used in combination of two or more.

Further, in a case where the fluorinated coating material of the present invention is a solvent-based coating material, a monomer 2 other than the monomer 2D-S may be used in combination.

In a case where the fluorinated coating material of the present invention is a solvent-based coating material, the fluorinated polymer preferably contains from 10 to 70 mol % of the units based on the monomer 2D-S to all units in the fluorinated polymer.

In such a case, the fluorinated polymer preferably has, to all units in the fluorinated polymer, the units F, the units 1 and the units based on the monomer 2D-S in contents of from 20 to 80 mol %, from 1 to 25 mol % and from 10 to 70 mol %, respectively.

Further, in such a case, Mn of the fluorinated polymer is preferably from 1,000 to 50,000, more preferably from 5,000 to 30,000, from the viewpoint of impact resistance of the present coating film.

In a case where the fluorinated coating material of the present invention is a solvent-based coating material, the organic solvent contained in the fluorinated coating material is preferably a solvent in which solubility of the fluorinated polymer is high. The organic solvent may, for example, be specifically an aromatic hydrocarbon, a ketone, an ester, an alcohol or an ether ester, preferably xylene, ethylbenzene, acetone, methyl ethyl ketone, ethyl acetate, ethanol, tert-butyl alcohol or ethyl 3-ethoxypropionate.

The organic solvent may be used in combination of two or more.

In such a case, the content of the fluorinated polymer in the fluorinated coating material of the present invention is, from the viewpoint of the solubility of the fluorinated polymer in the solvent and thixotropy index of the solvent-based coating material, preferably from 30 to 90 mass %, more preferably from 40 to 80 mass % to the total mass of the solvent-soluble coating material.

Further, in such a case, the thixotropy index of the fluorinated polymer is preferably from 1.5 to 10, more preferably from 2.0 to 8.0, from the viewpoint of coating efficiency of the solvent-soluble coating material.

In a case where the fluorinated polymer is powdery, and the fluorinated coating material of the present invention is a coating material used as a powder coating material, with a view to keeping Tg of the fluorinated polymer high and improving the blocking resistance of the powder coating material, at least a part of the units 2D are preferably units based on a monomer wherein $Z^2$ is a $C_{4-8}$ alkyl group represented by the formula —C($Z^{21}$)$_3$, a $C_{6-10}$ cycloalkyl group, a $C_{6-10}$ cycloalkylalkyl group, a $C_{6-10}$ aryl group or a $C_{7-12}$ aralkyl group (hereinafter sometimes referred to as "monomer 2D-P"). The three $Z^{21}$'s are each independently a $C_{1-5}$ alkyl group.

The group represented by the formula —C($Z^{21}$)$_3$ has a tertiary carbon atom represented by "C (carbon atom)" in the formula to which three groups of the formula $Z^{21}$ are bonded. The three $Z^{21}$'s are preferably such that all the three are methyl groups, one is a methyl and the other two are each independently a $C_{2-5}$ alkyl group, or two are a methyl group and one is a $C_{3-5}$ alkyl group. In a case where one is a methyl group and the other two are each independently a $C_{2-5}$ alkyl group, the total number of carbon atoms in the two $Z^{21}$ among the three is preferably from 4 to 6. It is more preferred that the group represented by the formula —C($Z^{21}$)$_3$ is a tert-butyl group, or two groups represented by the formula $Z^{21}$ are methyl groups and the other is a tertiary alkyl group which is a $C_{3-5}$ alkyl group.

The $C_{6-10}$ cycloalkyl group is preferably a cyclohexyl group.

The $C_{6-10}$ cycloalkylalkyl group is preferably a cyclohexylmethyl group.

The $C_{7-12}$ aralkyl group is preferably a benzyl group.

The $C_{6-10}$ aryl group is preferably a phenyl group or a naphthyl group, more preferably a phenyl group.

Hydrogen atoms in the cycloalkyl moiety of the cycloalkyl group or the cycloalkylalkyl group and the aryl moiety in the aryl group or the aralkyl group may be substituted by an alkyl group. In such a case, the number of carbon atoms of the alkyl group as the substituent is not included in the number of carbon atoms of the cycloalkyl group or the aryl group.

The monomer 2D-P may, for example, be specifically cyclohexyl vinyl ether, tert-butyl vinyl ether, vinyl neononanoate (manufactured by HEXION, tradename: "VeoVa 9"), vinyl pivalate, vinyl benzoate, tert-butyl (meth)acrylate or benzyl (meth)acrylate.

The monomer 2D-P may be used in combination of two or more.

Further, in a case where the fluorinated coating material of the present invention is a powder coating material, a monomer 2 other than the monomer 2D-P may be used in combination.

In a case where the fluorinated coating material of the present invention is a powder coating material, the fluorinated polymer preferably contains from 15 to 60 mol %, more preferably from 20 to 50 mol % of the units based on the monomer 2D-P to all units in the fluorinated polymer.

Further, in such a case, the fluorinated polymer preferably contains, to all units in the fluorinated polymer, the units F, the units 1 and the units based on the monomer 2D-P in contents of from 20 to 80 mol %, from 1 to 25 mol % and from 15 to 60 mol %, respectively.

In a case where the fluorinated coating material of the present invention is a powder coating material, Mn of the fluorinated polymer is preferably from 1,000 to 30,000, particularly preferably from 5,000 to 30,000, from the viewpoint of the impact resistance of the present coating film and the melt viscosity of the powder coating material.

In such a case, the melt viscosity of the fluorinated polymer at 170° C. is preferably from 20 to 200 Pa·s, particularly preferably from 20 to 100 Pa·s, from the viewpoint of the impact resistance and the surface smoothness of the present coating film. Further, the melt viscosity of the fluorinated polymer at 200° C. is preferably from 1 to 200 Pa·s, particularly preferably from 10 to 100 Pa·s from the viewpoint of the impact resistance and the surface smoothness of the present coating film.

In such a case, the average particle size of the powder coating material is preferably from 1 to 100 μm, particularly preferably from 25 to 50 μm from the viewpoint of the coating efficiency of the powder coating material and the surface smoothness of the present coating film.

In a case where the fluorinated coating material of the present invention further contains water, the fluorinated polymer is dispersed in water, and the fluorinated coating material is a coating material used as an aqueous coating material, from the viewpoint of the dispersibility of the fluorinated polymer in water, at least a part of the units 2 preferably have a group represented by the formula —$Y^2$—O($M^2$O)$_{n2}R^2$, more preferably are units based on a monomer wherein $Z^2$ is a group represented by the formula —$Y^2$—O($M^2$O)$_{n2}R^2$(hereinafter sometimes referred to as "monomer 2D-W"). In a case where $R^2$ is a hydrogen atom, the monomer 2D-W is not included in a monomer having a hydroxy group, and the group represented by the formula —$Y^2$—O($M^2$O)$_{n2}R^2$ is not included in a crosslinkable group.

$Y^2$ is a $C_{2-12}$ bivalent saturated hydrocarbon group, and is preferably a $C_{4-12}$ alkylene group or an alkylene group containing a $C_{6-8}$ cycloalkylene group. The bivalent saturated hydrocarbon group may be linear or branched. Further, the bivalent saturated hydrocarbon group may be a cyclic structure or may contain a cyclic structure.

$M^2$ is a $C_{2-4}$ alkylene group, and at least 50% by the number of n2 $M^2$'s are ethylene groups, and it is more preferred that from 80 to 100% by the number of n2 $M^2$'s are ethylene groups, and it is particularly preferred that all the n2 $M^2$'s are ethylene groups. In a case where the number of carbon atoms in $M^2$ is 3 or 4, $M^2$ may be linear or branched. Further, in a case where two or more types of $M^2$ are present, ($M^2$O)$_{n2}$ may be a random polymer chain with different ($M^2$O) or may be a block polymer chain.

$R^2$ is a hydrogen atom or an alkyl group having at most 4 carbon atoms, preferably a hydrogen atom or a methyl group, particularly preferably a hydrogen atom.

n2 is an integer of from 8 to 22, preferably an integer of from 10 to 20.

As specific examples of the monomer 2D-W, $CH_2$=CHO—$CH_2$-cycloC$_6$H10—$CH_2$—O($CH_2CH_2O)_{n2}H$, $CH_2$=CHCH$_2$O—$CH_2$-cycloC$_6$H10—$CH_2$'O($CH_2CH_2O)_{n2}H$, $CH_2$=CHOCH$_2$CH$_2$O($CH_2CH_2O)_{n2}H$, $CH_2$=CHCH$_2$OCH$_2$CH$_2$O($CH_2$CH$_2$O)$_{n2}H$ and $CH_2$=CHCH$_2$OCH$_2$CH(C$_4$H9)O($CH_2CH_2O)_{n2}H$ may be mentioned.

"-cycloC$_6$H10—" represents a cyclohexylene group, and the binding site of (-cycloC$_6$H$_{10}$—) is not particularly limited and is usually 1,4-.

The monomer 2D-W may be used in combination of two or more.

Further, in a case where the fluorinated coating material of the present invention is an aqueous coating material, a monomer 2 other than the monomer 2D-W may be used in combination.

In a case where the fluorinated coating material of the present invention is an aqueous coating material, the fluorinated polymer contains, from the viewpoint of the dispersibility of the fluorinated polymer in water, the units based on the monomer 2D-W in a content of preferably from 0.1 to 10 mol %, more preferably from 1 to 5 mol % to all units in the fluorinated polymer.

In such a case, the fluorinated polymer preferably contains, to all units in the fluorinated polymer, the units F, the units 1 and the units based on the monomer 2D-W in contents of from 20 to 80 mol %, from 1 to 25 mol % and from 0.1 to 10 mol %, respectively.

In such a case, Mn of the fluorinated polymer is, from the viewpoint of stability of the fluorinated polymer in the form of particles, preferably from 30,000 to 200,000, more preferably from 50,000 to 180,000.

In a case where the fluorinated coating material of the present invention is an aqueous coating material, the fluorinated polymer is dispersed in water in the form of particles. A dispersion having the fluorinated polymer in the form of particles dispersed in water will sometimes be referred to as an aqueous dispersion of the fluorinated polymer.

Water is a dispersion medium in which the fluorinated polymer is dispersed. In a case where the fluorinated coating material of the present invention is an aqueous coating material, the dispersion medium may consist solely of water or may be a mixed solvent of water and a water-soluble organic solvent. In the latter case, the content of the water-soluble organic solvent is preferably at most 5 mass %, more preferably at most 1 mass %, particularly preferably at most 0.5 mass % to the total mass of water contained in the aqueous dispersion. The water-soluble organic solvent may, for example, be methanol, ethanol, butanol, acetone or methyl ethyl ketone.

In the aqueous dispersion of the fluorinated polymer, the content of the fluorinated polymer is, from the viewpoint of the stability of the fluorinated polymer in the form of particles, preferably from 10 to 90 mass %, more preferably from 30 to 60 mass % to the total mass of the aqueous dispersion.

Further, the average particle size of the fluorinated polymer in the form of particles is, from the viewpoint of water resistance of the present coating film and storage stability of the fluorinated polymer in the form of particles, preferably from 30 to 300 nm, more preferably from 50 to 200 nm.

In a case where the fluorinated coating material of the present invention is an aqueous coating material, the content of the fluorinated polymer in the fluorinated coating material of the present invention, from the viewpoint of the weather resistance of the present coating film, preferably from 10 to 70 mass %, more preferably from 20 to 65 mass % to the total mass of the aqueous coating material.

Further, a part of the units 2 may be units based on a monomer having a crosslinkable group, other than the monomer 1, regardless of the form of the fluorinated coating material. The crosslinkable group may, for example, be a hydroxy group, a hydrolyzable silyl group, a carboxy group, an amino group, an isocyanate group, an epoxy group or an oxetanyl group. The crosslinkable group is preferably a hydroxy group.

The fluorinated polymer of the present invention may be obtained by a method of copolymerizing monomers (monomer F, monomer 1 and monomer 2) in the presence of a solvent and a radical polymerization initiator. A monomer other than the monomer F, the monomer 1 and the monomer 2 may properly be used. As a specific example of the method for producing the fluorinated polymer, suspension polymerization method, emulsion polymerization method or solution polymerization method may be mentioned.

The reaction temperature during polymerization is usually from 0 to 130° C., the reaction pressure is usually from 0 to 1.0 MPa, and the reaction time is usually from 1 to 50 hours.

Further, as mentioned above, the fluorinated polymer having the units 1C may be produced by adding a polycarboxylic acid anhydride to an organic solvent solution of a fluorinated polymer having no units having a carboxy group and having units having a hydroxy group so that they react with each other. Specifically, for example, the monomer F, the monomer having a hydroxy group and the monomer 2 having no hydroxy group are polymerized in an organic solvent to obtain a polymer having the units F, units based on the monomer having a hydroxy group and units based on the monomer 2 having no hydroxy group, and further reacting the polymer with a dicarboxylic acid anhydride to convert hydroxy groups of the units having a hydroxy group to carboxy groups thereby to produce a fluorinated polymer having the units 1C.

The fluorinated polymer of the present invention may be used as a coating material component. The content of the fluorinated polymer in the fluorinated coating material is preferably from 1 to 100 mass % to the total mass of the coating material.

The fluorinated coating material preferably contains a curing agent. The curing agent is a compound having at least 2 groups reactive with a crosslinkable group (for example, the carboxy group or the hydroxy group in the unit 1 or the crosslinkable group in the unit 2) in the fluorinated polymer. By the curing agent being reacted with the crosslinkable group in the fluorinated polymer, the fluorinated polymer is crosslinked, the present coating film is cured, whereby the strength of the present coating film improves. The curing agent usually has from 2 to 30 reactive groups in one molecule.

The curing agent in the present invention is preferably a compound having in one molecule at least 2 isocyanate groups, blocked isocyanate groups, epoxy groups, carbodiimide groups, oxazoline groups or β-hydroxyalkylamide groups. In a case where the fluorinated polymer in the present invention has the units 1C, the curing agent is preferably a compound having in one molecule at least 2 epoxy groups, carbodiimide groups, oxazoline groups or β-hydroxyalkylamide groups. In a case where the fluorinated polymer of the present invention has the units based on the monomer 1A, the curing agent is preferably a compound having in one molecule at least two isocyanate groups or blocked isocyanate groups.

The compound having at least 2 isocyanate groups in one molecule is preferably a polyisocyanate monomer or a polyisocyanate derivative.

The polyisocyanate monomer is preferably an alicyclic polyisocyanate, an aliphatic polyisocyanate or an aromatic polyisocyanate. The polyisocyanate derivative is preferably a multimer or modified product of the polyisocyanate monomer.

The aliphatic polyisocyanate may, for example, be specifically an aliphatic diisocyanate such as tetramethylene diisocyanate, pentamethylene diisocyanate, hexamethylene diisocyanate, 2,2,4-trimethyl-1,6-diisocyanatohexane or lysine diisocyanate, or lysine triisocyanate, 4-isocyanatomethyl-1,8-octamethylene diisocyanate or bis(2-isocyanatoethyl)2-isocyanatoglutarate.

The alicyclic polyisocyanate may, for example, be specifically an alicyclic diisocyanate such as isophorone diisocyanate, 1,3-bis(isocyanatomethyl)-cyclohexane, 4,4'-dicyclohexylmethane diisocyanate, norbornene diisocyanate or hydrogenated xylylene diisocyanate.

The aromatic polyisocyanate may, for example, be specifically an aromatic diisocyanate such as 2,4-tolylene diisocyanate, 2,6-tolylene diisocyanate, 4,4'-diphenylmethane diisocyanate, naphthalene diisocyanate or xylylene diisocyanate.

The compound having at least two blocked isocyanate groups in one molecule is preferably a compound having at least two isocyanate groups in the above-described polyisocyanate monomer or polyisocyanate derivative blocked by a blocking agent.

The blocking agent is a compound having active hydrogen and may, for example, be specifically an alcohol, a phenol, activated methylene, an amine, an imine, an acid amide, a lactam, an oxime, pyrazole, imidazole, imidazoline, pyrimidine or guanidine.

The compound having in one molecule at least two epoxy groups may, for example, be specifically a bisphenol type epoxy compound (such as A type, F type or S type), a diphenyl ether type epoxy compound, a hydroquinone type epoxy compound, a naphthalene type epoxy compound, a biphenyl type epoxy compound, a fluorene type epoxy compound, a hydrogenated bisphenol A type epoxy compound, a bisphenol A-containing nuclear polyol type epoxy compound, a polypropylene glycol type epoxy compound, a glycidyl ester type epoxy compound, a glycidylamine type epoxy compound, a glyoxal type epoxy compound, an alicyclic epoxy compound, an alicyclic multifunctional epoxy compound, or a heterocyclic epoxy compound (such as triglycidyl isocyanurate).

The compound having at least two carbodiimide groups in one molecule may, for example, be specifically an alicyclic carbodiimide, an aliphatic carbodiimide, an aromatic carbodiimide or a multimer or modified product thereof.

The compound having at least two oxazoline groups in one molecule may, for example, be specifically an addition-polymerizable oxazoline having a 2-oxazoline group or a polymer of the addition-polymerizable oxazoline.

The compound having at least 2 β-hydroxyalkylamide groups in one molecule may, for example, be specifically Primid XL-552 (manufactured by EMS).

The curing agent may be used in combination of two or more. In a case where the fluorinated polymer of the present invention has at least two types of crosslinkable groups, for example, the aqueous coating material of the present invention may contain at least two types of curing agent crosslinkable with the respective crosslinkable groups.

In a case where the fluorinated coating material of the present invention contains a curing agent, the content of the curing agent is preferably from 1 to 50 mass %, more preferably from 1 to 20 mass % to the total mass of the fluorinated polymer.

The fluorinated coating material of the present invention may contain a resin containing no fluorine atom (hereinafter referred to as "non-fluorinated resin"). In such a case, the mass ratio of the non-fluorinated resin to the fluorinated polymer in the fluorinated coating material of the present invention is preferably from 0.30 to 3.5, more preferably from 0.35 to 3.0.

The non-fluorinated resin is preferably a polyester resin, a (meth)acrylic resin or an epoxy resin, which is solid at room temperature under normal pressure, and from the viewpoint of the substrate adhesion of the present coating film and from the viewpoint of the layer separation of the present coating film, preferably a polyester resin or a (meth)acrylic resin.

The polyester resin may, for example, be specifically "CRYLCOAT (registered trademark) 4642-3", "CRYLCOAT (registered trademark) 4890-0" or "CRYLCOAT (registered trademark) 4842-3" manufactured by DAICEL-ALLNEX LTD., "U-pica Coat (registered trademark) GV-250", "U-pica Coat (registered trademark) GV-740", "U-pica Coat (registered trademark) GV-175" or "U-pica Coat (registered trademark) GV-110" manufactured by Japan U-pica Company Ltd., or "Uralac (registered trademark) 1680" manufactured by DSM.

The (meth)acrylic resin may, for example, be specifically "FINEDIC (registered trademark) A-249", "FINEDIC (registered trademark) A-251" or "FINEDIC (registered trademark) A-266" manufactured by DIC Corporation, "ALMATEX (registered trademark) PD6200" or "ALMATEX (registered trademark) PD7310" manufactured by Mitsui Chemicals, Inc., or "SANPEX PA-55" manufactured by Sanyo Chemical Industries, Ltd.

The epoxy resin may, for example, be specifically "Epikote (registered trademark) 1001", "Epikote (registered trademark) 1002" or "Epikote (registered trademark) 4004P" manufactured by Mitsubishi Chemical Corporation, "EPICLON (registered trademark) 1050" or "EPICLON (registered trademark) 3050" manufactured by DIC Corporation, "Epotohto (registered trademark) YD-012", "Epotohto (registered trademark) YD-014" or "Epotohto (registered trademark) YDCN704" manufactured by Nippon Steel & Sumikin Chemical Co., Ltd., "DENACOL (registered trademark) EX-711" manufactured by Nagase ChemteX Corporation, or "EHPE3150" manufactured by Daicel Corporation.

The fluorinated coating material of the present invention may contain components other than the above (hereinafter sometimes referred to as "additive") as the case requires.

The additive may, for example, be specifically a pigment, a curing catalyst, an ultraviolet absorber (an organic ultraviolet absorber, an inorganic ultraviolet absorber, etc.), a light stabilizer (a hindered amine light stabilizer, etc.), a matting agent (micronized synthetic silica, etc.), a levelling agent, a surface conditioner, a degassing agent, a plasticizer, a filler, a heat stabilizer, a thickener, a dispersing agent, an antistatic agent, an anticorrosive agent, a silane coupling agent, a soil release agent or a low pollution treatment agent.

The fluorinated coating material of the present invention may be produced by mixing the respective components. For example, in a case where the fluorinated coating material of the present invention is a powder coating material, it is produced preferably by the following method.

First, from a solution containing a fluorinated polymer obtained by solution polymerization method, the organic solvent is distilled off to obtain a powder of the fluorinated polymer. Then, the powder and as the case requires, a curing agent, a non-fluorinated resin, additives, etc. are melt-kneaded at from 80 to 130° C. to obtain a melt-kneaded product. Then, the obtained melt-kneaded product was cooled to obtain a solidified melt-kneaded product. Then, the solidified melt-kneaded product is pulverized and classified to obtain a powder coating material having a desired particle size.

In a case where the fluorinated coating material of the present invention is an aqueous coating material, it is preferred that an aqueous dispersion of a fluorinated polymer is obtained by emulsion polymerization method and as the case requires, a curing agent, a non-fluorinated resin, an additive or the like is mixed with the aqueous dispersion to obtain an aqueous coating material. Otherwise, the organic solvent of the solution containing the fluorinated polymer obtained by solution polymerization method is replaced with water to make the fluorinated polymer be dispersed in water thereby to obtain an aqueous coating material. As a specific example of the method of replacing the organic solvent in the solution containing the fluorinated polymer with water, a method of neutralizing carboxy groups of the fluorinated polymer to have the fluorinated polymer migrate to the aqueous phase and then removing the organic solvent may be mentioned.

In a case where the fluorinated coating material of the present invention is a solvent-based coating material, it is preferred that a solution containing a fluorinated polymer is obtained by solution polymerization method and as the case requires, a curing agent, a non-fluorinated resin, an additive or the like is mixed with the solution to obtain a solvent-based coating material.

The coated article of the present invention comprises a substrate, and a coating film formed from the coating material on the substrate.

The material of the substrate may, for example, be specifically an inorganic material, an organic material or an organic/inorganic composite material.

The inorganic material may, for example, be specifically concrete, natural stone, glass, or a metal (such as iron, stainless steel, aluminum, copper, brass or titanium).

The organic material may, for example, be specifically a plastic, a rubber, an adhesive or wood.

The organic/inorganic composite material may, for example, be specifically fiber-reinforced plastic, resin-reinforced concrete or fiber-reinforced concrete.

Further, the substrate may be subjected to known surface treatment (e.g. chemical treatment). Further, on the surface of the substrate, a resin layer (e.g. a polyester resin or an acrylic resin) may be formed.

Among them, the material of the substrate is preferably a metal, more preferably aluminum. An aluminum substrate is excellent in corrosion resistance, light in weight and suitable for an application to building material, such as an exterior member.

The shape, size, etc. of the substrate are not particularly limited.

The substrate may, for example, be specifically an exterior member for building such as a composite panel, a curtain wall panel, a curtain wall frame or a window frame, an automobile member such as a tire wheel, a wiper blade or an automobile exterior, construction machinery, or a frame of a motorcycle.

The filmi thickness of the present coating film is preferably from 20 to 1,000 μm, more preferably from 20 to 500 μm. In an application to e.g. a member of a high-rise building, such as an aluminum curtain wall, the film thickness is preferably from 20 to 90 μm. In an application where the requirement for weather resistance is high, such as an outdoor unit of an air conditioner installed on the coast, a pole of a traffic signal or a sign, it is preferably from 100 to 200 μm.

As a method for producing the coated article, preferred is a method of applying the fluorinated coating material of the present intention to a substrate to form a coating material layer, and curing the coating material layer to form the present coating film on the substrate.

As specific examples of the method for forming the coating material layer, an electrostatic coating method, an electrostatic spraying method, an electrostatic dipping method, a misting method, a flow immersion method, a blowing method, a spraying method, a thermal spraying method, and a plasma spraying method may be mentioned. Particularly when the fluorinated coating material of the present invention is a powder coating material, an electrostatic coating method using a powder coating gun is preferred.

The powder coating gun may, for example, be specifically a corona charging type spray gun or a friction charging type spray gun. The corona charging type spray gun is a spray gun for spraying a powder coating material by corona discharge treatment. The friction charging type spray gun is a spray gun for spraying a powder coating material by frictional charge treatment.

As specific examples of the method for curing the coating layer, drying and heat treatment may be mentioned. The heating temperature and the heating retention time are properly set depending upon e.g. the type and the composition of components contained in the fluorinated coating material, and the desired thickness of the coating film. The heating temperature is usually from 26 to 200° C., and the heating retention time is usually from 2 to 60 minutes. After heating, the coating layer is preferably cooled to 20 to 25° C. to form the present coating film. The cooling may be either quenching or annealing, and is preferably annealing from the viewpoint of the substrate adhesion of the present coating film.

In a case where the fluorinated polymer of the present invention has the units 1C, the carboxy groups are reacted with the curing agent (such as a compound having in one molecule at least two epoxy groups, carbodiimide groups, oxazoline groups or β-hydroxyalkylamide groups), whereby the coating layer is cured at lower temperature. The reaction of the carboxy groups and the curing agent is advantageous in that no high temperature (at a level of 200° C.) is not requires, as in the case of using a curing agent having an isocyanate group.

EXAMPLES

Now, the present invention will be described in further detail with reference to Examples. However, it should be understood that the present invention is by no means restricted to such specific Examples. Further, blend amounts of the respective components in Tables given later are based on mass.

Ex. 1C to 3C and 6C are Examples of the present invention, and Ex. 4C and 5C are Comparative Examples. Further, Ex. 1A to 3A and 6A to 7A are Examples of the present invention, and Ex. 4A and 5A are Comparative Examples.

[Components Used for Producing Fluorinated Coating Material]

(Fluorinated Polymer)

Fluorinated polymers obtained by the after-described Ex. using the following monomers were used.

Monomer F: $CF_3CH=CHF$ (HFO-1234ze), $CF_3CF=CH_2$ (HFO-1234yf)

Monomer X: $CF_2=CF_2$ (TFE)

Monomer 1: 10-Undecylenic acid (UDA, corresponding to monomer 1C), hydroxyethyl allyl ether (HEAE, corresponding to monomer 1A), allyl alcohol (AA, corresponding to monomer 1A)

Monomer 2: Vinyl neononanoate (V9) (manufactured by HEXION, tradename: "VeoVa 9"), ethyl vinyl ether (EVE), 4-hydroxybutyl vinyl ether (HBVE), vinyl acetate (AV), vinyl benzoate (VBn), vinyl versatate (VV)

Ex. 1C

Into an autoclave (internal capacity: 2.7 L) which had been evacuated of air, butyl acetate (376 g), HFO-1234ze (410 g), HFO-1234yf (103 g), UDA (149 g), V9 (331 g) and EVE (136 g) were introduced, heated with stirring and kept at 65° C.

Then, into the autoclave, a 50 mass % xylene solution of tert-butyl peroxypivalate (hereinafter sometimes referred to as "polymerization initiator solution") (2 g) was added to start polymerization. During the polymerization, the polymerization initiator solution (13.8 g) was continuously added. The polymerization was continued with stirring, and 15 hours later, the autoclave was cooled with water to terminate the polymerization.

Then, the solution in the autoclave was subjected to filtration, and unreacted monomers contained in the obtained filtrate were removed by an evaporator to obtained a solution containing fluorinated polymer 1C (fluorinated polymer concentration: 75 mass %).

The fluorinated polymer 1C was a polymer containing units based on HFO-1234ze, units based on HFO-1234yf, units based on UDA, units based on V9 and units based on EVE in amounts of 40 mol %, 10 mol %, 9 mol %, 20 mol % and 21 mol % in this order. Of the fluorinated polymer 1C, Mn was 8,000 and the acid value was 39 mgKOH/g.

The solution (80 g) containing the fluorinated polymer 1C was mixed with a compound having at least 2 epoxy groups in one molecule (manufactured by HUNTSMAN, PT-910 (tradename), hereinafter sometimes referred to as "epoxy curing agent") (11 g), a curing catalyst (a xylene solution of dibutyltin dilaurate (100-fold diluted, the same applies hereinafter) (3 g) and xylene (100 g) to obtain a solvent-based coating material. The obtained solvent-based coating material was applied by a film applicator to the surface of an aluminum plate having chromate treatment applied thereto so that the dry film thickness would be 40 µm, and held at 25° C. for 30 minutes and then at 80° C. for 5 minutes to obtain an aluminum plate provided with a coating film having a coating film formed from the solvent-based coating material. The obtained aluminum plate provided with a coating film as test specimen 1C was subjected to evaluations as described hereinafter.

Ex. 2C

The solution containing the fluorinated polymer 1C obtained in Ex. 1C was vacuum dried at 65° C. for 24 hours to remove the solvent, and further vacuum dried at 130° C. for 20 minutes to obtain fluorinated polymer 1C in a block form, which was pulverized to obtain powdery fluorinated polymer 1C.

The obtained powdery fluorinated polymer 1C (100 g), the epoxy curing agent (8.6 g), the curing catalyst (0.4 g), a surface modifier (manufactured by BYK Japan K. K., BYK-360P (tradename)) (1.7 g), a degassing agent (benzoin) (0.7 g) and a pigment (manufactured by DuPont, Ti-Pure R960 (tradename)) (58.4 g) were mixed by a high-speed mixer to obtain a powdery mixture. The mixture was melt-kneaded by a twin-screw extruder at a barrel set temperature of 120° C. to obtain pellets. The obtained pellets were pulverized at 25° C. and classified to obtain a powder coating material having an average particle size of about 40 µm.

The obtained powder coating material was applied by electrostatic coating on the surface of an aluminum plate having chromate treatment applied thereto so that the dry film thickness would be 40 µm, and held at 170° C. for 20 minutes to obtain an aluminum plate provided with a coating film having a coating film formed from the powder coating material. The obtained aluminum plate provided with a coating film as test specimen 2C was subjected to evaluation as described hereinafter.

Ex. 3C

In the same manner as in Ex. 1C and Ex. 2C except that the types and amounts of monomers were changed as identified in Table 1, powdery fluorinated polymer 1C was obtained.

The obtained powdery fluorinated polymer 1C was dissolved in methyl ethyl ketone to obtain a solution containing fluorinated polymer 1C (fluorinated polymer concentration: 40 mass %). 300 g of the solution was put in a flask, a 20 mass % acetone solution (15.1 g) of succinic anhydride and triethylamine (0.072 g) were added, followed by reaction at 70° C. for 6 hours. Then, to the solution in the flask, triethylamine (3.26 g) was added, followed by stirring at 25° C. for 20 minutes, and then 180 g of deionized water was gradually added, followed by vacuum distillation, and deionized water (90 g) was further added to obtain an aqueous dispersion (fluorinated polymer concentration: 40 mass %) containing fluorinated polymer 2C, not containing methyl ethyl ketone and acetone.

The fluorinated polymer 2C was a polymer having units based on HFO-1234ze, units based on HFO-1234yf, units based on HBVE, units formed by addition of succinic anhydride to a hydroxy group of units based on HBVE (units 1C having —O(CH$_2$)$_4$OC(O)CH$_2$CH$_2$COOH in a side chain, hereinafter sometimes referred to as "HBVE-SA"), units based on V9 and units based on EVE in amounts of 40 mol %, 10 mol %, 6 mol %, 3 mol %, 20 mol % and 21 mol % in this order. Of the fluorinated polymer 2C, the acid value was 17 mgKOH/g, and Mn was 9,000.

Then, a pigment (manufactured by SAKAI CHEMICAL INDUSTRY CO., LTD., D918 (tradename)) (72 g), a dispersing agent (manufactured by BYK-Chemie, BYK-190 (tradename)) (5 g), an antifoaming agent (manufactured by BASF, Dehydran 1620 (tradename)) (0.5 g) and deionized water (22.5 g) were mixed to obtain a mill base.

Then, the aqueous dispersion (70 g) containing fluorinated polymer 2C, the epoxy curing agent (2.1 g), a compound having at least 2 isocyanate groups in one molecule (manufactured by Bayer AG, Bayhydur 3100 (tradename)) (8 g), a film-forming assistant (manufactured by Aldrich, CS-12) (5 g) and the mill base (25 g) were mixed to obtain an aqueous coating material. The obtained aqueous coating material was applied by a film applicator on an aluminum plate having chromate treatment applied thereto so that the dry film thickness would be 40 µm, and held at 25° C. for 60 minutes, and held at 80° C. for 20 minutes to obtain an aluminum plate provided with a coating film having a coating film formed from the aqueous coating material. The obtained aluminum plate provided with a coating film as test specimen 3C was subjected to evaluations as described hereinafter.

Ex. 4C to 6C

In the same manner as in Ex. 1 except that the types and amounts of monomers were changed as identified in Table 1, and the epoxy curing agent was changed to a compound having at least 2 isocyanate groups in one molecule (manufactured by Nippon Polyurethane Industry Co., Ltd., CORONATE HX (tradename), hereinafter sometimes referred to as "isocyanate curing agent"), fluorinated polymer 3C and fluorinated polymer 4C and test specimen 4C and test specimen 5C were obtained.

Further, in the same manner as in Ex. 1 except that the types and amounts of monomers were changed as identified in Table 1, fluorinated polymer 5C and test specimen 6C were obtained.

[Evaluation Method]
(Substrate Adhesion of Coating Film)

It was evaluated by cross-cut test (JIS K 5600-5-6). The coating film of a test specimen was cut into a grid with 100 cells at 1 mm intervals, an adhesive tape was bonded thereon and then peeled, and from the number of cells which were not peeled by the adhesive tape among the 100 cells (the number of cells/100), the substrate adhesion was evaluated in accordance with the following standard.

S: The number of cells being higher than 95.
A: The number of cells being higher than 90 and at most 95.
B: The number of cells being less than 90.

(Water Repellency of Coating Film)

With respect to the test specimens 1C to 6C, the static contact angle of water to the test specimen was measured.

Pure water having a diameter of 1 to 2 mm was dropped on the surface of the test specimen, and the droplet 30 minutes after dropping was recorded by a video camera and the image was analyzed. Twice the angle formed by the line connecting the edge point and the top of the droplet, and the test specimen, was taken as the angle of the static contact angle.

A: Static contact angle of water to test specimen being at least 100 degree

B: Static contact angle to test specimen being less than 100 degree

Physical properties of the fluorinated polymer and evaluation results of the coating film in each of Ex. 1C to 6C are shown in Table 1.

The obtained solvent-based coating material was applied by a film applicator on an aluminum plate having chromate treatment applied thereto so that the dry film thickness would be 40 μm, and held at 25° C. for 30 minutes and then at 80° C. for 5 minutes to obtain an aluminum plate provided with a coating film having a coating film formed from the solvent-based coating material. The obtained aluminum plate provided with a coating film as test specimen 1A was subjected to evaluations as described hereinafter.

Ex. 2A

In the same manner as in Ex. 1A except that the types and amounts of monomers were changed as identified in Table 1, a solution containing fluorinated polymer 2A was obtained. The obtained solution was vacuum dried at 65° C. for 24 hours to remove the solvent, and further vacuum dried at

TABLE 1

|  |  |  | Ex. 1C | Ex. 2C | Ex. 3C | Ex. 4C | Ex. 5C | Ex. 6C |
|---|---|---|---|---|---|---|---|---|
|  | Fluorinated polymer |  | 1C | 1C | 2C | 3C | 4C | 5C |
| Content of units in | Units F | HFO-1234ze | 40 | 40 | 40 | 40 |  | 50 |
| fluorinated polymer |  | HFO-1234yf | 10 | 10 | 10 | 10 |  |  |
| (mol %) | Units X | TFE |  |  |  |  | 50 |  |
|  | Units 1 | UDA | 9 | 9 |  |  |  | 9 |
|  |  | HBVE-SA |  |  | 3 |  |  |  |
|  | Units 2 | V9 | 20 | 20 | 20 | 20 | 20 | 20 |
|  |  | EVE | 21 | 21 | 21 | 21 | 21 | 21 |
|  |  | HBVE |  |  | 6 | 9 | 9 |  |
|  | Acid value (mgKOH/g) |  | 39 | 39 | 17 | 0 | 0 | 39 |
|  | Mn |  | 8,000 | 8,000 | 9,000 | 7,000 | 7,000 | 10,000 |
| Evaluation | Water repellency of coating film |  | A | A | A | A | B | A |
|  | Substrate adhesion of coating film |  | S | S | S | B | A | A |

As shown in Table 1, by using the fluorinated polymer having carboxy groups, a coating film excellent in water repellency and excellent in substrate adhesion can be formed (Ex. 1C to 3C and 6C).

Ex. 1A

Into an autoclave (internal capacity: 2.7 L) which have been evacuated of air, butyl acetate (394 g), HFO-1234ze (456 g), HFO-1234yf (114 g), HEAE (92 g), V9 (368 g) and EVE (151 g) were introduced, heated with stirring and held at 65° C.

Then, into the autoclave, the polymerization initiator solution (2 g) was added to start polymerization. During the polymerization, the polymerization initiator solution (14.5 g) was continuously added. The polymerization was continued with stirring, and 15 hours later, the autoclave was cooled with water to terminate the polymerization.

Then, the solution in the autoclave was subjected to filtration, and unreacted monomers contained in the obtained filtrate were removed by an evaporator to obtain a solution containing fluorinated polymer 1A.

The fluorinated polymer 1A was a polymer containing units based on HFO-1234ze, units based on HFO-1234yf, units based on HEAE, units based on V9 and units based on EVE in amounts of 40 mol %, 10 mol %, 9 mol %, 20 mol % and 21 mol % in this order. Of the solution containing the fluorinated polymer 1A, the fluorinated polymer concentration was 75 mass %, and Mn was 8,000.

The fluorinated polymer 1A (80 g) was mixed with the isocyanate curing agent (11 g), the curing catalyst (3 g) and xylene (100 g) to obtain a solvent-based coating material.

130° C. for 20 minutes to obtain fluorinated polymer in a block form, which was pulverized to obtain powdery fluorinated polymer 2A.

Then, the powdery fluorinated polymer 2A (52 g), the isocyanate curing agent (13 g), the curing catalyst (0.2 g), the pigment (manufactured by DuPont, Ti-Pure R960 (tradename)) (35 g), the degassing agent (benzoin) (0.4 g) and the surface modifier (manufactured by BYK Japan K. K., BYK-360P (tradename)) (1 g) were mixed by a high-speed mixer to obtain a powdery mixture. The powdery mixture was melt-kneaded by a twin-screw extruder at a barrel setting temperature of 120° C. to obtain pellets. The obtained pellets were pulverized by a pulverizer at 25° C. and classified by a 150 mesh sieve to obtain a powder coating material having an average particle size of about 40 μm.

The obtained powder coating material was applied by electrostatic coating to the surface of an aluminum plate having chromate treatment applied thereto and held in an atmosphere at 200° C. for 20 minutes to form a molten film of the powder coating material. The molten film was left to stand and cooled to 25° C. to obtain an aluminum plate provided with a coating film, having a coating film having a thickness of from 55 to 65 μm formed from the powder coating material. The obtained aluminum plate provided with a coating film as test specimen 2A was subjected to evaluations as described hereinafter.

Ex. 3A to 5A and 7A

In the same manner as in Ex. 1 except that the types and amounts of monomers were changed, fluorinated polymers 3A to 5A and 7A were obtained. Then, in the same manner as in Ex. 1 except that the type of the fluorinated polymer was changed, test specimens 3A to 5A and 7A were obtained.

Ex. 6A

Into an autoclave (internal capacity: 2.7 L) which had been evaluated of air, HFO-1234ze (370 g), HFO-1234yf (93 g), HEAE (147 g), VV (314 g), EVE (123 g), VBn (27 g), deionized water (1,000 g), potassium carbonate (1.5 g), DKS NL-100 (50.1 g) and SLS (1.0 g) were introduced with stirring, heated and held at 50° C.

Then, into the autoclave, a 0.4 mass % aqueous solution (50 mL) of ammonium persulfate was continuously added to conduct polymerization for 24 hours, and then the solution in the autoclave was subjected to filtration to obtain an aqueous dispersion (solid content concentration: 48 mass %) containing particles of fluorinated polymer 6A. Of the obtained aqueous dispersion, the average particle size of the particles of the fluorinated polymer 6A was 190 nm.

The fluorinated polymer 6A was a polymer having units based on HFO-1234ze, units based on HFO-1234yf, units based on HEAE, units based on VV, units based on EVE and units based on VBn in amounts of 35 mol %, 9 mol %, 16 mol %, 19 mol %, 19 mol % and 2 mol % in this order.

A pigment (D918 (tradename, manufactured by SAKAI CHEMICAL INDUSTRY CO., LTD.)) (72 g), a dispersing agent (BYK-190 (tradename, manufactured by BYK-Chemie)) (5 g), an antifoaming agent (Dehydran 1620 (tradename, manufactured by BASF)) (0.5 g) and deionized water (22.5 g) were mixed to obtain a mill base.

Then, the aqueous dispersion (70 g) containing particles of fluorinated polymer 6A, a curing agent (Bayhydur 3100 (tradename, manufactured by Bayer, isocyanate curing agent)) (8 g), a film-forming assistant (CS-12 (tradename, manufactured by Aldrich)) (5 g) and the mill base (25 g) were mixed to obtain an aqueous coating material.

Then, the obtained aqueous coating material was applied by a film applicator on an aluminum plate having chromate treatment applied thereto so that the dry film thickness would be 40 μm, aged at 25° C. for 60 minutes and then dried at 80° C. for 20 minutes to form a coating film, thereby to obtain an aluminum plate provided with a coating film. The obtained aluminum plate provided with a coating film as test specimen 6A was subjected to evaluations as described hereinafter.

[Evaluation Methods]
(Copolymerizability of Fluorinated Polymer)

From the yield of the obtained fluorinated polymer and by NMR analysis, the reactivity of the monomer F or the monomer X and the reactivity of the monomer 1 were calculated, to evaluate copolymerizability of the fluorinated polymer.

A: The reactivity of the monomer F or the monomer X being at least 90%, and the reactivity of the monomer 1 being at least 90%.

B: The reactivity of the monomer F or the monomer X being less than 90%, and the reactivity of the monomer 1 being less than 90%.

(Weather Resistance of Coating Film)

Using xenon weather meter (manufactured by Suga Test Instruments Co., Ltd.), the time until the coating film was peeled was measured with respect to the test specimens 1A to 7A.

<Test Conditions>
Relative humidity: 70% RH
Temperature: 50° C.
Light source: 80 W/m² (300 to 400 nm)

<Evaluation Standard>
S: Peeling occurred for the first time over a period of 320 hours or more.
A: Peeling occurred for the first time over a period of at least 300 hours and less than 320 hours.
B: Peeling occurred for the first time over a period of at least 250 hours and less than 300 hours.
C: Peeling occurred for the first time over a period of less than 250 hours.

Physical properties of the fluorinated polymer and the results of evaluation of the coating film formed from the coating material in each of Ex. 1 A to 7A are shown in Table 2.

TABLE 2

|  |  |  | Ex. 1A | Ex. 2A | Ex. 3A | Ex. 4A | Ex. 5A | Ex. 6A | Ex. 7A |
| --- | --- | --- | --- | --- | --- | --- | --- | --- | --- |
| Fluorinated polymer | | | 1A | 2A | 3A | 4A | 5A | 6A | 7A |
| Content of units in fluorinated polymer (mol %) | Units F | HFO-1234ze | 40 | 40 | 30 | 40 | | 40 | |
| | | HFO-1234yf | 10 | 10 | 20 | 10 | | 10 | 50 |
| | Units X | TFE | | | | | 50 | | |
| | Units 1 | HEAE | 9 | 9 | | | 9 | 14 | 9 |
| | | AA | | | 8 | | | | |
| | Units 2 | AV | | | | 22 | | | |
| | | V9 | 20 | 41 | | 20 | 20 | | 20 |
| | | VV | | | | | | 17 | |
| | | VBn | | | | | | 2 | |
| | | EVE | 21 | | 20 | 21 | 21 | 17 | 21 |
| | | HBVE | | | | 9 | | | |
| Copolymerizability of fluorinated polymer | | | A | A | A | A | B | A | A |
| Weather resistance of coating film | | | S | S | S | C | B | A | A |

As shown in Table 1, a fluorinated coating material containing a fluorinated polymer having the units 1A and the units 2, excellent in copolymerizability with the units F, is capable of forming a coating film excellent in weather resistance (Ex. 1A to 3A and 6A to 7A).

What is claimed is:
1. A fluorinated coating material comprising a fluorinated polymer having the following units F, the following units 1 and the following units 2:
   units F: at least one type of units selected from the group consisting of units based on CF$_3$—CH=CHF and units based on CF$_3$—CF=CH$_2$;
   units 1: at least one type of units selected from the group consisting of units having a carboxy group, units based on allyl alcohol and units based on a hydroxyalkyl allyl ether;

units 2: at least one type of units selected from the group consisting of units based on a vinyl ether, units based on a vinyl ester, units based on an allyl ether (excluding a hydroxyalkyl allyl ether), units based on an allyl ester and units based on a (meth)acrylic acid ester.

2. The fluorinated coating material according to claim 1, wherein the units F consist of units based on $CF_3$—CH=CHF and units based on $CF_3$—CF=$CH_2$.

3. The fluorinated coating material according to claim 1, wherein the content of the units F is from 20 to 80 mol % to all units in the fluorinated polymer.

4. The fluorinated coating material according to claim 1, wherein the units having a carboxy group are units based on a monomer represented by the formula $CHR^{11}$=$CHR^{12}$-$Q^1$-COOH:
wherein $R^{11}$ and $R^{12}$ are each independently a hydrogen atom or a $C_{1-3}$ alkyl group, and $Q^1$ is a single bond, a $C_{1-12}$ alkylene group or a $C_{4-12}$ alkylene group having —C(=O)O—.

5. The fluorinated coating material according to claim 1, wherein the units having a carboxy group are units having a carboxy group formed by reacting a polycarboxylic acid anhydride with hydroxy groups of a fluorinated polymer having units having a hydroxy group.

6. The fluorinated coating material according to claim 1, wherein at least a part of the units 2 are at least one type of units selected from the group consisting of units based on a vinyl ether and units based on a vinyl ester, and the total content of the units based on a vinyl ether and the units based on a vinyl ester is from 10 to 50 mol % to all units in the fluorinated polymer.

7. The fluorinated coating material according to claim 1, which further contains a curing agent, wherein the curing agent is a compound having in one molecule at least two epoxy groups, carbodiimide groups, oxazoline groups or β-hydroxyalkylamide groups.

8. The fluorinated coating material according to claim 1, which further contains an organic solvent, the fluorinated polymer being dissolved in the organic solvent, and which is used as a solvent-based coating material.

9. The fluorinated coating material according to claim 1, wherein the fluorinated polymer is powdery, and which is used as a powder coating material.

10. The fluorinated coating material according to claim 9, wherein the units 2 have a $C_{4-8}$ alkyl group represented by the formula —C($Z^{21}$)$_3$ (wherein three $Z^{21}$'s are each independently a $C_{1-5}$ alkyl group), a $C_{6-10}$ cycloalkyl group, a $C_{6-10}$ cycloalkylalkyl group, a $C_{6-10}$ aryl group or a $C_{7-12}$ aralkyl group.

11. The fluorinated coating material according to claim 1, which further contains water, the fluorinated polymer being dispersed in water, and which is used as an aqueous coating material.

12. The fluorinated coating material according to claim 11, wherein at least a part of the units 2 have a group represented by the formula —$Y^2$—O($M^2$O)$_{n2}R^2$,
wherein $Y^2$ is a $C_{2-12}$ bivalent saturated hydrocarbon group, M2 is a $C_{2-4}$ alkylene group, and at least 50% by the number of n2 $M^2$'s are ethylene groups, $R^2$ is a hydrogen atom or an alkyl group having at most 4 carbon atoms, and n2 is an integer of from 8 to 22.

13. A method for producing the fluorinated coating material as defined in claim 11, which comprises adding a polycarboxylic acid anhydride to an organic solvent solution of the fluorinated polymer having no units having a carboxy group and having units having a hydroxy group, so that they react with each other, to obtain a fluorinated polymer having units having a carboxy group, and replacing the organic solvent with water to disperse the fluorinated polymer in water.

14. A method for producing a coated article, which comprises applying the fluorinated coating material as defined in claim 1 on a substrate to form a coating layer, and curing the coating layer to form a coating film on the substrate.

15. A coated article comprising a substrate and a coating film formed on the substrate from the fluorinated coating material as defined in claim 1.

* * * * *